United States Patent [19]
Parsen

[11] 3,764,031
[45] Oct. 9, 1973

[54] PORTABLE AND CONVERTIBLE REEL AND SMALL EQUIPMENT CARRYING TRAILER

[75] Inventor: Edward M. Parsen, Miller, S. Dak.

[73] Assignee: The Rausen Corporation, Milbank, S. Dak.

[22] Filed: June 3, 1971

[21] Appl. No.: 149,686

[52] U.S. Cl.......... 214/506, 214/130 C, 242/86.5 R
[51] Int. Cl............................ B60p 1/04, B60p 3/00
[58] Field of Search................. 214/DIG. 1, DIG. 4, 214/505, 506, 130 C, 77 R; 242/86.5 R; 280/402

[56] References Cited
UNITED STATES PATENTS

| 2,620,201 | 12/1952 | Brady, Sr. | 214/DIG. 1 |
|---|---|---|---|
| 2,775,357 | 12/1956 | Arment | 214/DIG. 4 |
| 3,544,031 | 12/1970 | White | 242/86.5 R |
| 1,864,676 | 6/1932 | Smith et al. | 214/DIG. 4 |
| 3,091,413 | 5/1963 | Leithiser | 214/77 R X |
| 2,987,203 | 6/1961 | Funk, Jr. | 214/506 |
| 3,000,587 | 9/1961 | Goode | 242/86.5 R |
| 1,231,040 | 6/1917 | Marshall | 214/DIG. 4 |

Primary Examiner—Albert J. Makay
Attorney—Clarence A. O'Brien and Harvey B. Jacobson

[57] ABSTRACT

A trailer assembly is provided which may be easily converted to carry various size cable reels or small construction equipment such as a trencher. The assembly includes an axle portion with a pair of telescopic reel supports, a telescoping tongue portion for pulling the axle portion, and a pair of channel-shaped rails for transporting the construction equipment.

18 Claims, 13 Drawing Figures

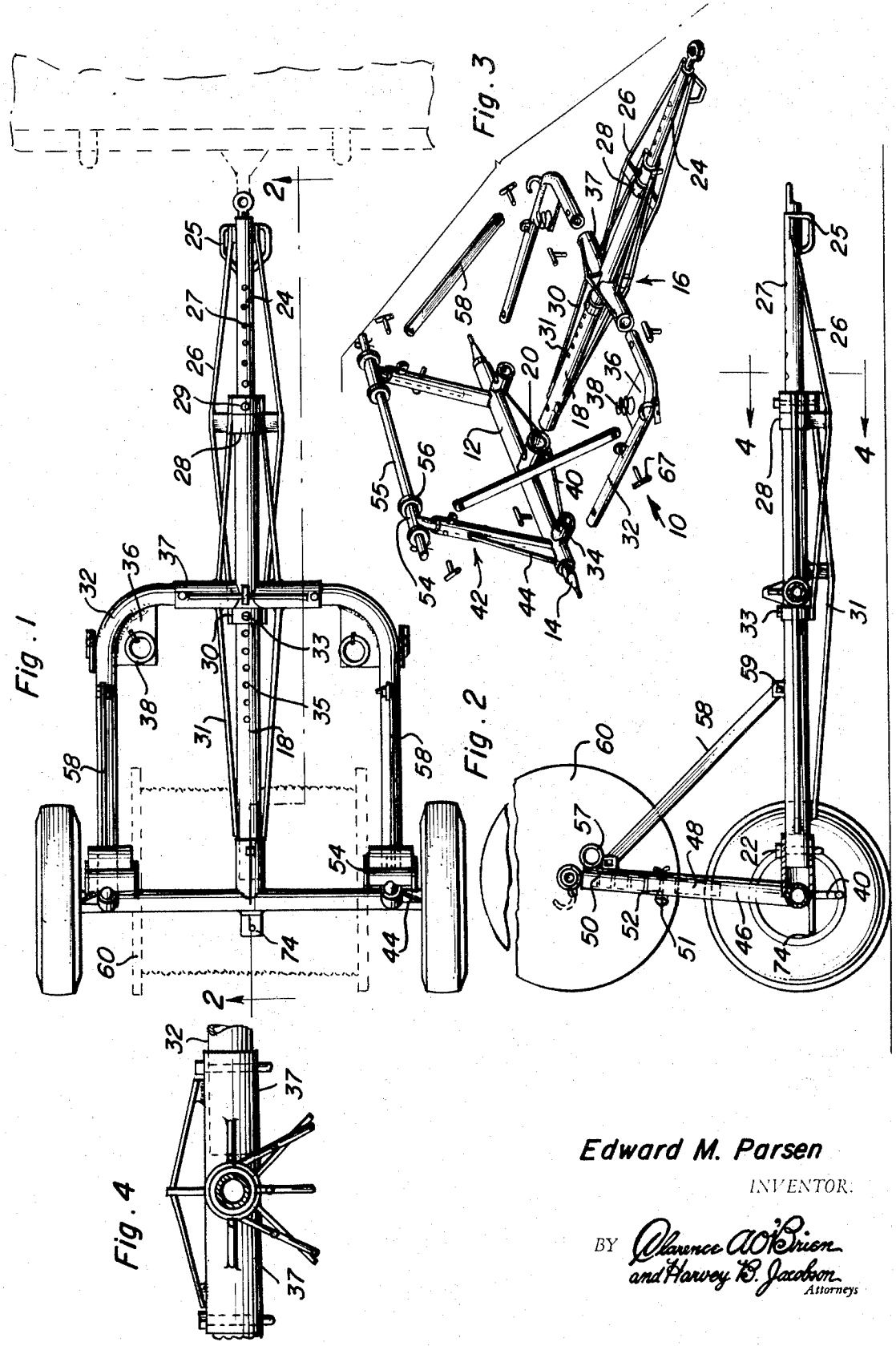

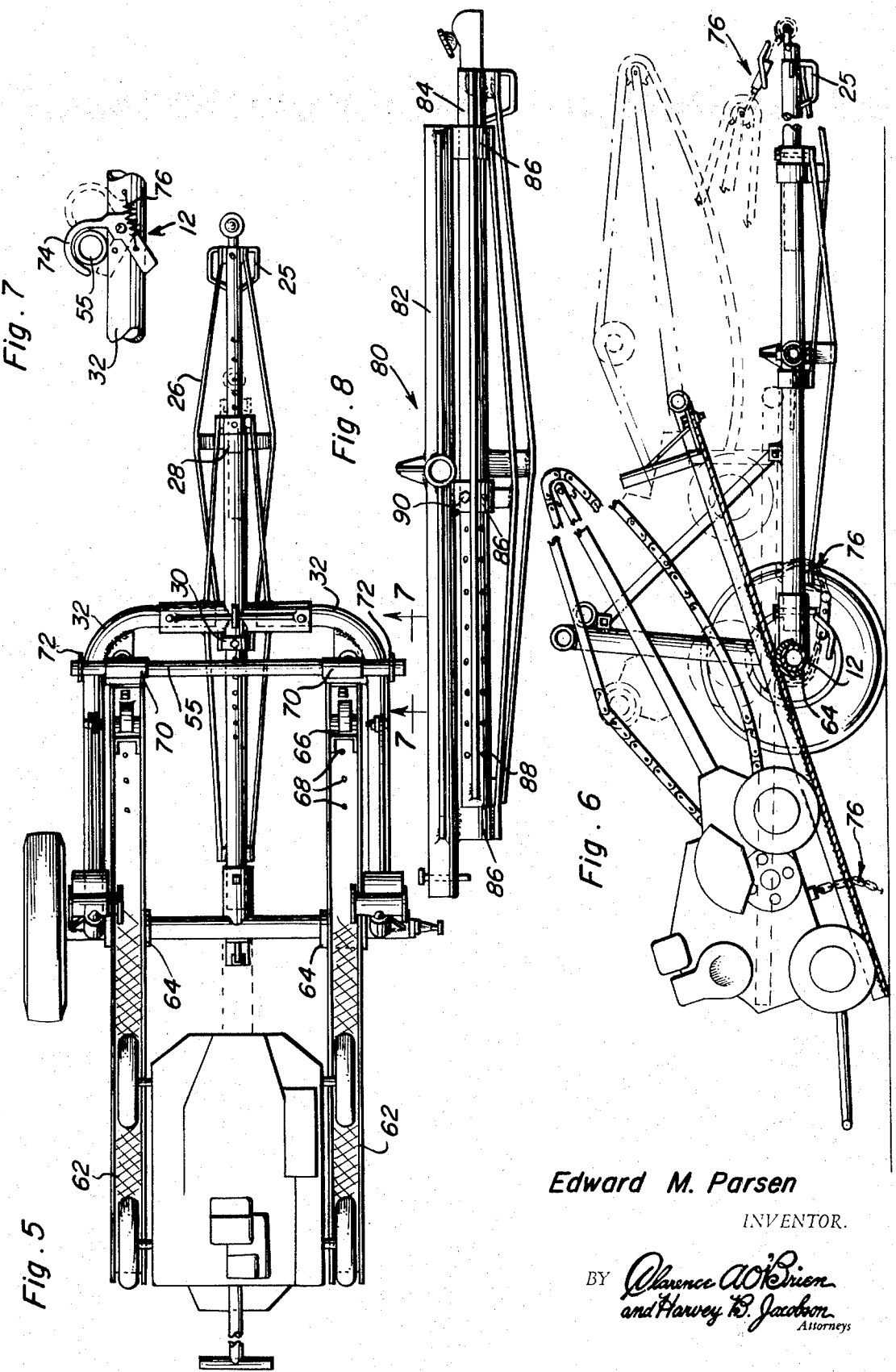

Patented Oct. 9, 1973
3,764,031
3 Sheets-Sheet 3
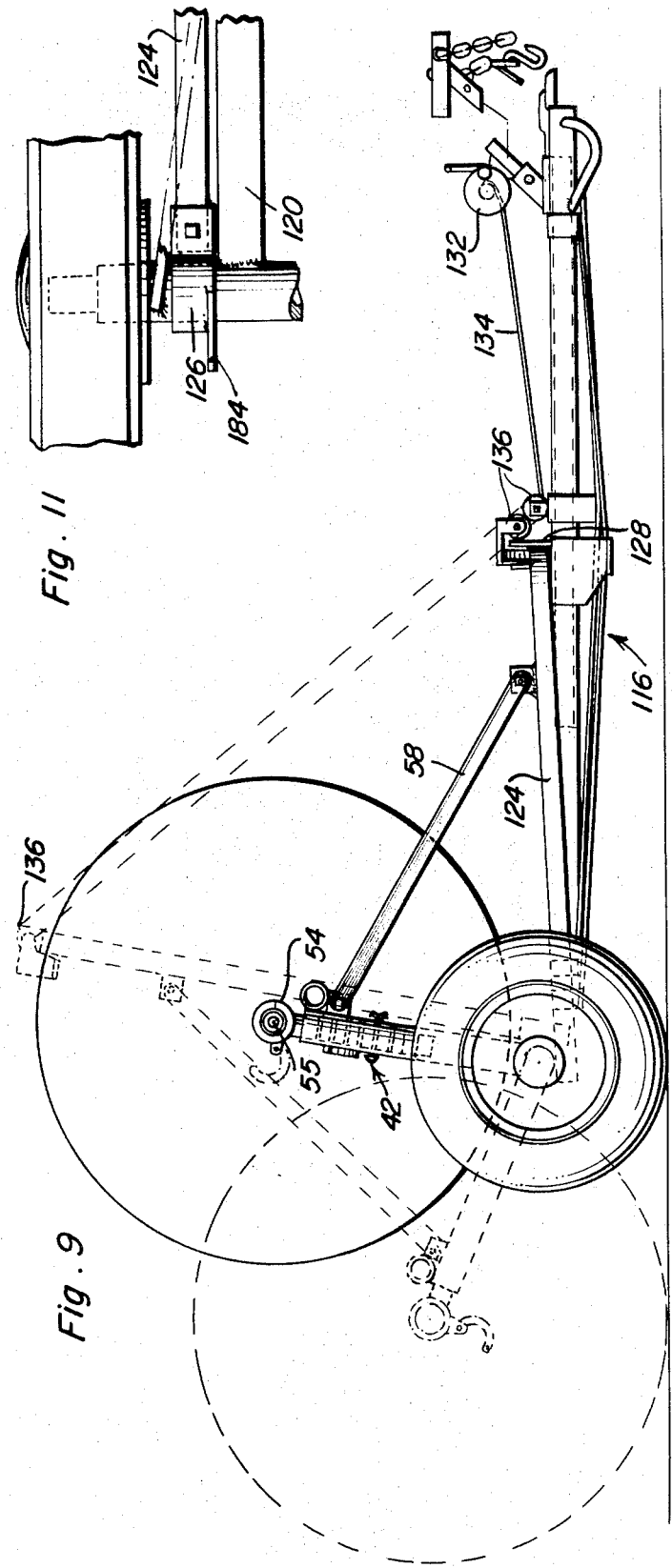
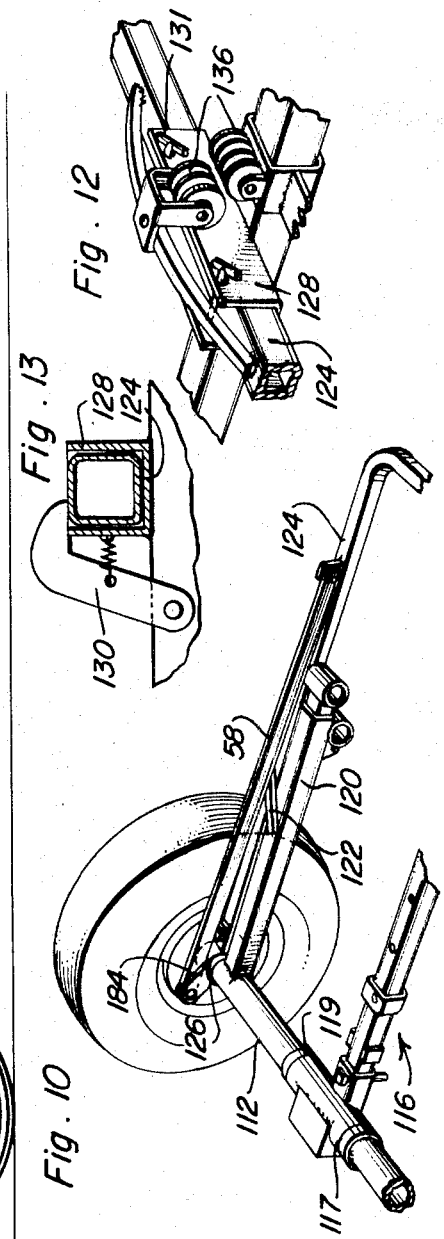
Edward M. Parsen
INVENTOR.
BY *Clarence A. O'Brien*
*and Harvey B. Jacobson*
Attorneys

PORTABLE AND CONVERTIBLE REEL AND SMALL EQUIPMENT CARRYING TRAILER

The present invention relates generally to vehicle drawn trailer assemblies which may be conveniently hitched to the towing vehicle.

In the past, a variety of trailer assemblies have been available to the construction industry. However, these have been single duty assemblies suitable for only the needs of each individual situation. Most reel carrying trailers could not be used to haul other materials or equipment. Similarly, construction equipment trailer assemblies could not be easily converted to carry materials such as cable reels. Since many construction projects involving the laying of underground electrical cable require the use of various small construction equipment, it is most advantageous to provide a multipurpose, convertible trailer assembly suitable for moving either cable reels or small construction equipment such as trenchers.

It is an object of the present invention to provide a trailer assembly which may be easily converted in the field to carry either reels of cable or small construction equipment such as a trencher.

It is another object of the present invention to provide a multipurpose, multi-duty trailer assembly having a tele-scoping tongue which can be easily adjusted in length to accommodate a variety of trailerable loads.

It is a further object of the present invention to provide a trailer assembly having adjustable telescoping upright supports to accommodate different sizes of cable reels.

Another object of the present invention is to provide a convertible trailer assembly which may be sold and delivered in kit form and easily assembled from its basic components by the use of a small number of bolts and pins which also enables the trailer to be easily knocked down for over-the-road transport in a truch body and easily reassembled when desired.

It is still a further object of the present invention to provide a trailer assembly whereby small construction equipment can be easily loaded onto the trailer, in some cases by hand.

Another object of the present invention is to provide a multipurpose trailer assembly whereby large cable reels may be easily loaded and unloaded without the aid of auxiliary equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the trailer assembly with cable reel loaded thereon and with tongue fully extended.

FIG. 2 is a side sectional view of the trailer assembly as seen along plane 2—2 of FIG. 1.

FIG. 3 is a group perspective view of the trailer assembly in disassembled form.

FIG. 4 is a sectional view taken along plane 4—4 of FIG. 2.

FIG. 5 is a view of the trailer assembly being loaded with construction equipment as seen from above.

FIG. 6 is a side view of the trailer assembly shown in FIG. 5 with phantom views of the equipment as it is loaded.

FIG. 7 is a side view of the spring-loaded snap lock taken along plane 7—7 of FIG. 5.

FIG. 8 is a side view of an alternate telescoping tongue in the collapsed position.

FIG. 9 is an elevated view of a modified form of the trailer assembly with the reel support assembly shown in phantom when positioned to lift a reel from the ground.

FIG. 10 is a partial perspective view of the trailer assembly shown in FIG. 9 with the reel support assembly in the folded position.

FIG. 11 is a partial plan view of an end portion of the axle with the reel support assembly in the folded position, as shown in FIG. 10.

FIG. 12 is a partial perspective view of the U-shaped support nested in the channel attached to the tongue.

FIG. 13 is a sectional view of a second form of the U-shaped support mounting.

Referring more specifically to FIG. 3, the basic trailer assembly is illustrated in disassembled form and is generally indicated by the numeral 10. It includes an elongated axle portion 12 having a pair of conventional spindles 14 to which a pair of wheel and brake assemblies may be mounted in a conventional manner. Axle portion 12 is connected to a telescoping tongue portion 16 by way of an elongated stationary tongue member 18 which is journaled into a centrally located axle collar 20 and held in place by a pin 22, such as a locking pin, which extends through a pair of aligned holes as shown in FIG. 2. The telescoping tongue 16 includes an adjustable tongue member 24 which is slidably journalled into stationary tongue member 18 and a pair of lifting handles 25. Added strength and support is furnished to movable tongue member 24 by sliding truss assembly 26 which is slidably journaled over tongue member 18 by way of a front sliding collar 28 and a rear sliding collar 30. Movable tongue member 24 includes a plurality of longitudinally spaced holes 27, one of which may be aligned with an aperture in member 18 through which pin 29 is inserted. Similarly, movable collar 30 may be provided with a hole and pin 33 for engagement with one of the apertures 35 in tongue portion 18. Thus, the over-all length of the tongue portion may be adjusted by a sliding movable tongue 24 inside of stationary tongue member 18 until the proper hole aligns with the aperture accommodating pin 29.

Additional connection between the axle and tongue portions is provided by way of L-shaped side support members 32 which are each journaled and pinned to offset axle collars 34 in a manner similar to stationary tongue member 18. The opposite end of each L-shaped member 32 is similarly journaled into and pinned with stationary tongue collars 37, as shown in FIG. 4. A stationary truss assembly 31 is appropriately fastened to opposite ends and the center of member 18. To the corner of each L-shaped member is welded a flat plate 36 which carries a shock-absorbing spring 38, the function of which is hereinafter explained.

The axle portion 12 may also be furnished with a support truss 40 which straddles the bottom of axle portion 12. A pair of telescopic reel support assemblies 42 extend upward from the axle portion 12 and may be braced by a pair of welded angle supports 44. Each assembly 42 includes a stationary upright support member 46, and movable support member 48 slidably journaled therein. The vertical position of movable member 48 may be adjusted by a pin and hole arrangement shown in FIG. 2, wherein a plurality of spaced apertures 50 in each movable support 48 are available for alignment with a hole 52 in each upright support member 46 to accommodate pin 51. This makes it possible to accommodate different size cable reels and still have adequate clearance between the reel and the axle. When carrying larger reels, movable support members 48 are slid upward until hole 52 aligns with the proper aperture in member 46, and a pin or bolt 51 is inserted therethrough to lock the support members 48 in the desired position. A reel bar support 54 is attached to the top end of each support member 48 at a point offset from its center, as shown in FIG. 1. Each reel bar support 54 has a pair of spaced flanges which serve to limit axial movement on the reel during transportation. Since each flange is offset a different distance from support member 48, 180° rotation of each support member 48 will vary the space between the confronting flanges to accommodate cable reels of different widths. Each reel bar support 54 is preferably of a split latch and pin construction to enable easier removal of the reel and reel bar. A pair of brace members 58 each extends from a tab 57 on each upright support member 46 to a tab portion 59 on each L-shaped member 32 to provide additional support to telescopic assemblies 42, as best shown in FIG. 2.

A cable reel 60 is shown mounted on trailer assembly in FIGS. 1 and 2. Each telescopic assembly 42 is angled slightly toward the front of the trailer assembly. As such, the weight of cable reel 60 produces a slight downward force on the front end of the tongue portion. This helps to stabilize the trailer assembly in the towed or in demounted resting positions. An angle of about 85° between assembly 42 and the tongue portion is found to provide sufficient stabilizing force at the end of the tongue portion which is not too great for the average man to overcome when lifting the tongue. To mount a cable reel, the tongue portion is tilted backward to an angle of about 60° until the reel bar 55 is properly aligned in reel bar support 54. At this point the open latches on each reel support engage the protruding ends of bar 55, and each latch closed around the bar ends. The wheels are chocked and the tongue portion is returned to the horizontal position either by hand or by a chain connected to the towing vehicle. For unloading, the procedure is simply reversed.

The trailer assembly may be easily converted to carry small construction equipment as shown in FIGS. 5 and 6. With the cable reel removed, a pair of guide rails 62 made of elongated steel channels are placed in position. The top inner surface of each rail 62 may be provided with a treaded surface for increased traction. A yoke member 64 is welded, or otherwise fastened, to the bottom surface of each rail near the center of each rail. Each yoke 64 is of semi-cylindrical, or similar shape, to properly seat on top of axle portion 12. A wheel stop 66 is mounted toward the front of each rail and may be adjusted in position by way of a plurality of holes 68 in each rail. The reel bar 55 is journaled through rail collars 70 fastened to the front end of each rail 62. This ties rails 62 together but permits adjustment of their spacing to correspond to the width of the equipment.

In the equipment loading procedure, the spacing of the rails 62 is adjusted to align with the equipment wheels or treads. The equipment is driven, winched or pushed up onto rails 62. As the equipment passes over the yoke-axle portion the weight shift tends to pivot the rails in a clockwise direction as shown in FIG. 6. The rails continue to pivot clockwise until collars 70 engage shock absorbing members 38. When the rail spacing is extremely small, shock absorbing members 38 will directly engage reel bar 55. In addition, end portions of reel bar 55 engage a pair of snap lock assemblies 72 each mounted on an L-shaped member 32. As shown in FIG. 7, a curved finger element 74, pivotally mounted to member 32, extends around reel bar 55 and is held in position by spring 76. As such, the rails 62 are automatically locked and securely fastened in the horizontal position. The equipment, such as the trencher shown in FIG. 6, may be secured to the trailer assembly by conventional anchor chains or boomers 76. By properly adjusting wheel stops 66 the balance of the equipment loaded trailer assembly may be set to permit easy lifting of the tongue portion by handles 25. The length of the telescoping tongue portion may be adjusted to accommodate pieces of equipment of various lengths. In FIGS. 1–6 tongue portion 10 is shown in the fully extended position. When carrying cable reels or short pieces of equipment, it may be desirable to shorten the tongue portion to provide better handling of the vehicle and trailer assembly.

FIG. 8 illustrates a second embodiment of the telescoping tongue portion. The operation and supporting trusses are basically the same as that of the tongue shown in FIG. 3. The telescoping tongue portion, generally indicated by the numeral 80, includes a stationary tongue member 82 which overlies a movable tongue member 84. Three stationary collars 86 extend downwardly from stationary tongue member 82 and around movable tongue portion 84. Movable tongue member 84 is journaled through collars 86 and includes a plurality of longitudinally spaced holes 88. The center collar includes a pair of holes adapted to align with a pair of the holes 88 and accept bolts 90 to fasten movable tongue member 84 in the desired position. The overlapping type of telescoping tongue may be more desirous for heavy loads since the cross-sectional area of movable member 84 can be as large as stationary members 82. The journaled type of telescoping tongue shown in FIG. 3 requires that the movable member 24 be of a smaller diameter than the stationary member 18. It will be appreciated, however, that either type of telescoping tongue may be used with the disclosed trailer assembly. It should also be noted, that small equipment (i.e. snowmobiles) other than construction equipment may be conveniently moved with the disclosed convertible trailer assembly.

Referring now to FIGS. 9–12, a modified form of the trailer assembly can be seen. In this form, the reel support assemblies are pivotally connected to the axle to permit them to be folded to a nearly horizontal position during use of the equipment carrying rails giving full load space between the wheels. Also, the L-shaped side supports are pivotally connected to the axle such that they may be pivoted backward along with the reel support assemblies to aid in the loading and unloading of the cable reels with the aid of a winch assembly mounted at the front of the tongue.

Referring to FIG. 10, it can be seen that tongue 116, similar to tongue 16 is pivotally journaled to axle 112 by way of a collar 117 which may be held against axial movement by ring members 119 welded to the axle. Each of the reel support assemblies 120 is rigidly welded or otherwise fastened to the axle, such that it is free to rotate relative to tongue 116. Each reel support assembly is provided with a small tubular support 122 mounted at an angle to the assembly to serve as a flag holder and a rest for a brace 58 when in the folded position. It should also be noted that each of the side supports 124 is pivotally connected to the axle by way of a side support collar 126, shown in more detail by FIG. 11.

With the reel support assemblies in the unfolded position, as shown in FIG. 9, they are rigidly connected to side supports 124 by way of braces 58, such that they may be pivoted about the axis of the axle in unison while tongue 16 remains in a stationary position. It should be noted that the side supports 124, rather than being L-shaped, are combined into a single U-shaped member which rests in a retaining channel 128 fastened to the top of tongue 116. Preferably, the U-shaped side support member may be held in retaining channel 128 by a locking mechanism 130 shown in FIG. 13 or by the locking pins 131 shown in FIG. 12, either of which may be easily removed when desired. As such, the reel support assemblies and side supports 124 may be pivoted in the backward direction to aid in the procedure of loading and unloading of cable reels. This arrangement is further enhanced by the addition of a winch assembly 132 connected to the front portion of tongue 116, and a cable 134 extending therefrom for winching, as hereinafter explained.

The procedure for loading a cable reel would be as follows. Assuming that the cable reel is resting on the ground, or similar surface, the trailer assembly is positioned such that the tongue extends in a direction perpendicular to the axis of the cable reel. Lock mechanism 130 is released, freeing the side supports 124 for rotation about the axle. The side supports 124, braces 58 and reel support assemblies 42 are pivoted in the backward direction until proper alignment is achieved between reel bar 55 and bar supports 54. The bar is appropriately fastened in a manner as hereinbefore explained, and winch 132 is turned to wind-in cable 134 through pulley 136, connected to support members 124. The winch is turned until the supports 124 approach retaining channel 128, at which time the offset weight of the cable reel will complete the forward rotation until support 124 engages the bottom of the retaining channel 128. Thus, it is appreciated that the modified form of the trailer assembly provides a relatively simple means by which the cable reels may be easily loaded and unloaded from the assembly and by which the reel support assemblies may be pivoted forward in a folded position permitting unobstructed use of the equipment carrying rails. To fold reel supports, pins are removed and braces 58 rotated on axis of forward anchor at tab 59 on support 124 allowing reel supports to be laid forward approximately parallel to said supports 124 by rotating about the axis of axle 12, rotation being accomplished by journals 117 and 126 and wheel spindles. After reel supports are laid down, braces 58 are rotated back to an approximately parallel position with side supports 124 and held in place by tabs 184, FIG. 10. As a stop for forward rotation of reel supports, angle brace 44, FIG. 3 engages side members 124, FIG. 10. With suitable calculation, a position nearly parallel to member 124 is achieved. To unfold or restore, the procedure is simply reversed.

When trailers are not used for hauling but must be moved to new locations, they may be easily disassembled for hauling by truck or other transport with one vehicle hauling one or more trailers easily. Disassembly is accomplished in a matter of minutes by removal of pins and bolts shown in FIGS. 2 and 3, or in the modified version, FIGS. 9–12. Thus, the trailer becomes a number of pieces as seen in FIG. 3, except for wheels and tires. These pieces with wheels and tires are easily loaded on a pickup or truck for over the highway transport. At the point of delivery pieces are unloaded and reassembled in a manner of minutes in a reverse of the disassembly procedure. For multiple use, as construction, axle 12 is fitted with hitch 74, FIG. 1, so trailers may be pulled in multiple allowing multiple reels to dispense more than one cable at a time. It can also be seen that the modified form of the trailer assembly utilizes side supports and reel support assemblies of rectangular cross-section, rather than circular cross-section. However, the members could be circular in cross-section. Also, it should be noted that winch 132 may be either hand operated or of the electrical type. Also, the number and position of the pulleys could be varied to achieve a greater or less mechanical advantage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable and convertible trailer assembly for carrying cable reels and mobile construction equipment comprising an axle portion adapted to carry a pair of wheels thereon, tongue means connected to said axle portion for connection to a towing vehicle, reel carrying means connected to said axle portion for supporting various sizes of reels, and separate rail means including means for pivotally resting on said axle portion adjacent rail reel carrying means for selective tilting to alternately load mobile equipment when said reel carrying means is not carrying a reel.

2. The assembly set forth in claim 1 wherein said reel carrying means includes means for adjusting its dimension to support a different size reel.

3. The assembly set forth in claim 2 wherein said adjustment means includes telescopic means having a plurality of spaced holes and an aperture, a pin extending through said aperture and through one of said plurality of holes which is in alignment with said aperture.

4. The assembly set forth in claim 1 wherein said reel carrying means includes a reel bar.

5. A portable and convertible trailer assembly for carrying cable reels and mobile construction equipment comprising an axle portion adapted to carry a pair of wheels thereon, tongue means connected to said axle portion for connection to a towing vehicle, reel carrying means connected to said axle portion for supporting various sizes of reels, rail means for resting on said axle portion for carrying mobile equipment when said reel carrying means is not carrying a reel, said rail means including a pair of parallel spaced rails each having a collar at the front end thereof, said reel bar slidably extending through each of said collars to connect said rails to each other whereby said rails may be slid transversely on said reel support bar to change the spacing therebetween.

6. A portable and convertible trailer assembly for carrying cable reels and mobile construction equipment comprising an axle portion adapted to carry a pair of wheels thereon, tongue means connected to said axle portion for connection to a towing vehicle, reel carrying means connected to said axle portion for supporting various sizes of reels, rail means for resting on said axle portion for carrying mobile equipment when said reel carrying means is not carrying a reel, said rail means including a pair of parallel spaced rails, each of said rails including a yoke extending from its bottom for pivotally resting on said axle portion.

7. The combination set forth in claim 5 together with snap lock means connected with said tongue means for selective engagement with said reel bar to fasten said rails to the trailer assembly.

8. The assembly set forth in claim 6 wherein said rail means includes wheel stop means connected to each of said rails, and means for selectively adjusting the longitudinal position of said wheel stop means.

9. The assembly set forth in claim 1 wherein said tongue means includes telescopic adjustment means for selectively adjusting the length of the trailer assembly to accommodate different sizes of mobile equipment.

10. A portable trailer assembly for carrying cable reels comprising an axle portion adapted to carry a set of wheels, tongue means connected to said axle portion for connection to a towing vehicle, reel carrying means connected to said axle portion for supporting a cable reel, said reel carrying means being selectively pivotal relative to said tongue means about the axis of said axle portion for conveniently loading and unloading cable reels to and from said reel carrying means, and support means connected to said axle portion and selectively fastened to said tongue means to maintain said reel carrying means in a stable orientation, said support means being rotatable relative to said reel carrying means and relative to said tongue means when not fastened thereto about the axis of said axle portion.

11. The assembly set forth in claim 10 wherein said support means includes a rigid support frame and brace means rigidly connecting said support frame with said reel carrying means, such that they rotate in unison about the axis of the axle portion and relative to said tongue means, and means for selectively unfastening said brace means between said support frame and said reel carrying means, such that they may rotate independent of each other.

12. The assembly set forth in claim 11 together with winch means connected to said tongue means for rotating said reel carrying means between a reel loading position and an upright reel carrying position.

13. The assembly set forth in claim 12 wherein said winch means includes a winch cable connected to said support frame for imparting rotation thereto about the axis of the axle portion.

14. The assembly set forth in claim 11 wherein said support frame is normally fastened to said tongue means by a selectively releasable latching mechanism.

15. The assembly set forth in claim 11 wherein said tongue means is connected to said axle portion by first readily releasable fastening means.

16. The assembly set forth in claim 15 wherein said support frame is connected to said axle portion by second readily releasable fastening means which permit easy assembly and disassembly for easy transportation from one place to another.

17. The assembly set forth in claim 16 wherein said support frame is normally connected to said tongue means by way of third readily releasable fastening means which permits selective pivotal movement of said support frame for conveniently loading and unloading said reel carrying means.

18. A portable trailer assembly for carrying cable reels comprising an axle portion adapted to carry a set of wheels, tongue means connected to said axle portion for connection to a towing vehicle, reel carrying means connected to said axle portion for supporting a cable reel, said reel carrying means being selectively pivotal relative to said tongue means about the axis of said axle portion for conveniently loading and unloading cable reels to and from said reel carrying means, and a pair of parallel rail means adapted to rest on said axle portion adjacent said reel carrying means for selective pivotal movement relative to said tongue means for alternately loading and carrying mobile equipment when said reel carrying means is pivoted to a substantially horizontal position and not carrying a reel.

* * * * *